United States Patent
Wu et al.

(10) Patent No.: US 6,229,986 B1
(45) Date of Patent: May 8, 2001

(54) RECONFIGURABLE ANALOG CHANNEL PROCESSOR FOR MULTIBEAM SATELLITES

(75) Inventors: Shih-Chang Wu, Alhambra; Wilbert B. Copeland, Los Angelos, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/193,947

(22) Filed: Nov. 18, 1998

(51) Int. Cl.$^7$ .................................................. H04B 7/185

(52) U.S. Cl. .................... 455/12.1; 455/427; 455/428; 455/18; 455/20; 455/22; 370/316; 370/323; 370/325

(58) Field of Search .................................. 455/12.1, 427, 455/428, 13.3, 13.4, 20, 22, 18, 19, 21; 370/325, 316, 323, 13.4, 12.1

(56) References Cited

U.S. PATENT DOCUMENTS

| | | | | |
|---|---|---|---|---|
| 4,315,262 | * | 2/1982 | Acampora et al. | 343/100 |
| 4,456,988 | * | 6/1984 | Nakagome et al. | 370/75 |
| 4,706,239 | * | 11/1987 | Ito et al. | 370/57 |
| 4,931,802 | * | 6/1990 | Assal et al. | 342/356 |

(List continued on next page.)

OTHER PUBLICATIONS

"In–orbit reconfigurable communications–satellite antennas," J.F. Balcewicz, *RCA Engineer* 28–2, Mar./Apr. 1983, pp 36–41.

"The L–Band Land Mobile Payload (LLM) Aboard Artemis," L. Miracapillo et al., *American Institute of Aeronautics and Astronautics*, 96–1086–CP, pp 879–887.

"Reconfigurable satellite antennas: a review," F. Rispoli, *Microwave and RF Engineering*, Apr. 1989, pp S22–S27.

"Recent Developments in Reconfigurable Reflectors," P.J.B. Clarricoats et al, *IEEE*, 90C112776–3XXX–1864 S1.(x) 1990, pp 1864–1867.

"A Novel Semi–Active Multibeam Antenna Concept," A. Roederer et al, *IEEE*, 90C112776–3XXX–1884 (x), 1990, pp 1884–1887.

"Inmarsat's Third Generation Space Segment," A. Howell et al, *American Institute of Aeronautics and Astronautics, Inc.*, 92–1815–CP, pp 92–99.

"Active Ku–Band Spaceborne Antennas: Design, Technology and Testing," D. Michel et al, *Alcatel Telecom*, pp 341–347.

"Active Antennas for Mulitple–Beam Communications Satellites: Status and Review," A.I. Zaghloul et al, *COMSAT Labs*, Clarksburg, MD 20871, pp 319–338.

(List continued on next page.)

*Primary Examiner*—William G. Trost
*Assistant Examiner*—Marceau Milord

(57) ABSTRACT

An analog transponder processor for use in a multibeam satellite receiving input beam signals and transmitting output beam signals has an input switch matrix, channel processors, and an output switch matrix. The input switch matrix power divides input beam signals into sets of input beam signals. The channel processors each receive at least one input beam signal from the input switch matrix. The channel processors filter the input beam signals into channel signals. Each of the channel signals corresponds to a respective channel of the input beam signals. The channel processors change the frequency of at least one channel signal such that the at least one channel signal corresponds to a different channel than the respective channel of the input beam signals. The output switch matrix combines the channel signals into output beam signals.

10 Claims, 2 Drawing Sheets

U.S. PATENT DOCUMENTS

| | | | |
|---|---|---|---|
| 5,274,627 | * | 12/1993 | De Santis .............................. 370/49.5 |
| 5,822,312 | * | 10/1998 | Peach et al. .......................... 370/323 |
| 5,924,031 | * | 7/1999 | Copeland et al. .................... 455/428 |
| 6,016,124 | * | 1/2000 | Lo et al. ............................... 342/373 |
| 6,047,162 | * | 4/2000 | Lazaris-Bruner et al. .......... 451/12.1 |
| 6,157,811 | * | 12/2000 | Dent ................................... 455/12.1 |

OTHER PUBLICATIONS

"A Design Method of a Reconfigurable Direct Radiating Array Antenna," T. Morooka et al, *IEICE Trans. Commun.*, vol. E77–B, No. 5, May 1994, pp 663–672.

"Resolution Performance of Adaptive Multiple Beam Antennas," K.M. SooHoo et al, Electronics Research Laboratory, The Aerospace Corporation.

"Reconfigurable Dual Feed Antenna for Direct Broadcast Satellites," N. Sultan et al, pp 27–35.

"The IRIDIUM® Main Mission Antenna Concept," J.J. Schuss et al, *IEEE* 0–7803–3232–6/96, pp 411–415.

"Anaren Low Cost, Lightweight Antenna Beamforming Networks," An Anaren Technical Publication M 1090–49, Aug. 11, 1994, pp 1–12.

"Multiple–Beam Antennas for Military Satellite Communications," J.J. Tavormina, *MSN & CT*, Oct. 1988, pp 20–24.

"Building on a Powerful Thought," Electromagnetic Sciences, Inc., *MSN & CT*, Oct. 1988, pp 2930.

"The Eutelsat II reconfigurable multibeam antennas: development review," G. Duret et al, *Ann. Telecommun.*, 44, No. 9–10, 1989, pp 501–513.

* cited by examiner

RECONFIGURABLE ANALOG CHANNEL PROCESSOR FOR MULTIBEAM SATELLITES

TECHNICAL FIELD

The present invention relates generally to multibeam satellite switching networks and, more particularly, to a reconfigurable analog channel processor for multibeam satellites.

BACKGROUND ART

Early communications satellites were used as dumb repeaters operating in a bent-pipe mode. Initially, no significant processing was carried in the satellite payload other than frequency translation and signal amplification and the information relayed to the destination was fundamentally identical to the information from the source. Multibeam satellites operating in the bent-pipe mode were then introduced. These multibeam satellites relayed messages from one or more sources to several destinations. However, the architecture of these multibeam satellites allowed limited flexibility in selecting between input sources and output destinations. Typical were the first broadcast satellites that relayed information to several geographic destinations.

Multibeam satellites having on-board switching capability were then introduced. In these satellites, incoming beams from a source carry several frequency-multiplexed channels. A typical satellite having on-board switching capability includes an input demultiplexer near the front end of the satellite. The input demultiplexer separates the incoming beams into transponder channels. These channels are then interbeam switched by means of coaxial switches so that information arriving from one of the incoming beams can be directed to one of several output beams.

SUMMARY OF THE INVENTION

An object of the present invention is to provide an analog transponder processor for a multibeam satellite which can route any channel from any input beam signal to any channel of any output beam signal and which can reconfigure the number of channels, the channel bandwidths, the channel center frequencies and guard-bands, and the channel filter shapes.

Another object of the present invention is to provide an analog transponder processor for a multibeam satellite which can operate in broadcast mode to route a channel from an input beam signal to more than one of the channels of the output beam signals.

In carrying out the above objects and other objects, the present invention provides an analog transponder processor for use in a multibeam satellite receiving input beam signals and transmitting output beam signals. The input and output beam signals have corresponding channels for carrying channel signals. The analog transponder processor includes an input switch matrix for power dividing input beam signals into sets of input beam signals. A plurality of channel processors each receive at least one input beam signal from the input switch matrix. The channel processors filter the input beam signals into channel signals. Each of the channel signals corresponds to a respective channel of the input beam signal. The channel processors change the frequency of at least one channel signal such that the at least one channel signal corresponds to a different channel than the respective channel of the input beam signals. An output switch matrix combines the channel signals into output beam signals. Each of the channel signals corresponds to a respective channel of the output beam signals.

In accordance with the analog transponder processor of the present invention, a processing method for use in a multibeam satellite is also provided.

These and other features, aspects, and embodiments of the present invention will become better understood with regard to the following description, appended claims, and accompanying drawings.

BEST MODES FOR CARRYING OUT THE INVENTION

Figure 1:
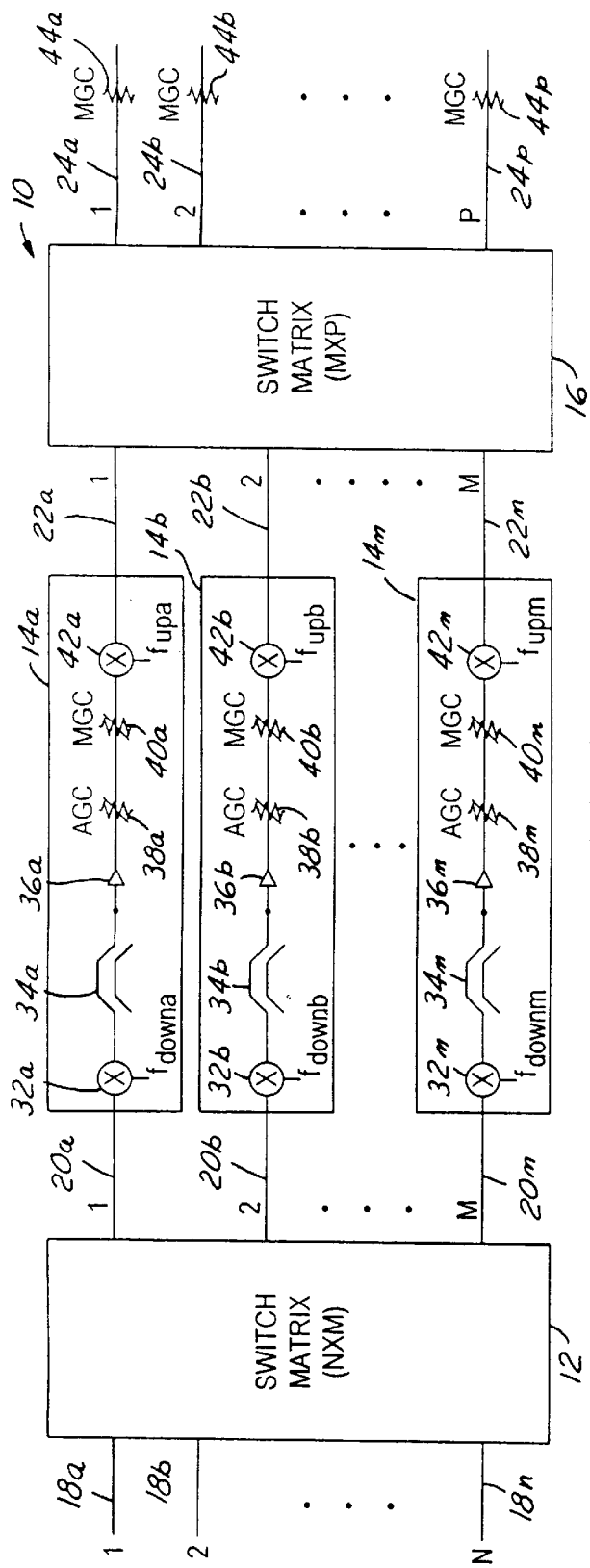
FIG. 1 illustrates a block diagram of a reconfigurable microwave analog transponder processor in accordance with the present invention.

Referring now to FIG. 1, a reconfigurable microwave analog transponder processor 10 in accordance with the present invention is shown. Processor 10 includes an input N×M microwave switch matrix 12, a bank of channel processors 14($a$–$m$), and an output M×P microwave switch matrix 16. Input switch matrix 12 power divides a maximum N input beam signals from receiver antenna circuitry (not specifically shown) into sets of M input beam signals and selectively routes the input beam signals to channel processors 14($a$–$m$). Channel processors 14($a$–$m$) filter the input beam signals into channel signals. Channel processors 14($a$–$m$) then change the frequency of selected channel signals to route them to selected channels of selected output beam signals. Channel processors 14($a$–$m$) also process the input beam channel signals to reconfigure the bandwidth, the center frequency, the guard-bands, the filter shapes, and the gain/loading of the channel signals. Output switch matrix 16 combines the channel signals into a maximum P output beam signals for transmitter antenna circuitry (not specifically shown). N, M, and P are natural numbers and M is greater than N and P.

Input switch matrix 12 includes N input beam ports 18($a$–$n$) for receiving the N input beam signals. Input switch matrix 12 further includes M output channel ports 20($a$–$m$) for providing the power divided input beam signals to respective channel processors 14($a$–$m$). Output switch matrix 16 includes M input channel ports 22($a$–$m$) for receiving the processed M channel signals from the respective channel processors 14($a$–$m$). Output switch matrix 16 further includes P output beam ports 24($a$–$p$) for transmitting the P output beam signals.

Figure 2:
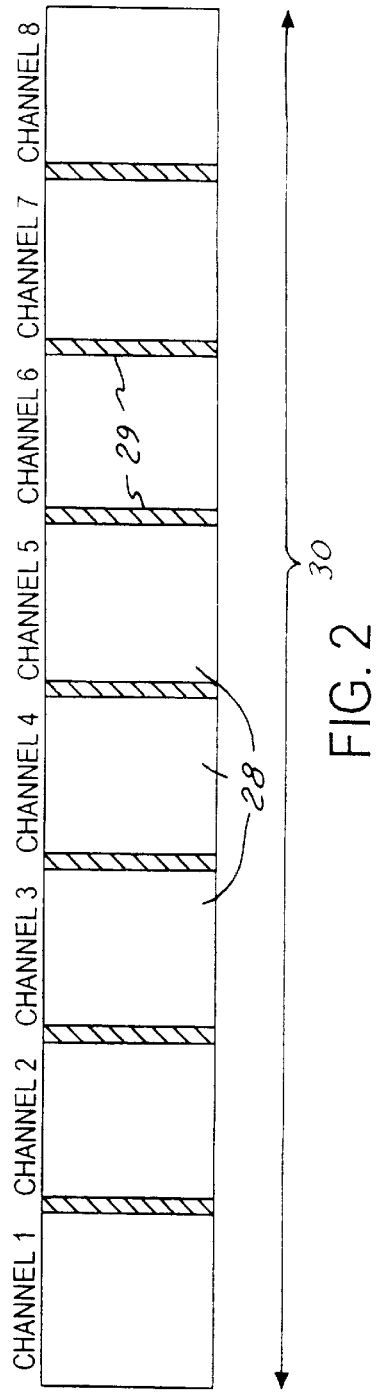
FIG. 2 illustrates the arrangement of an exemplary incoming beam signal.

Referring now to FIG. 2 with continual reference to FIG. 1, an exemplary beam signal 26 includes, as an example, eight non-overlapping frequency-separated channels 28 (separated by guard bands 29) within a frequency beam bandwidth 30. Frequency beam bandwidth 30 may be the same or different for each of the beam signals. The frequency band of the beam signals is at some regular communication frequency (e.g., L-Band, S-Band, C-Band, Ku-Band, or Ka-Band).

Input switch matrix 12 power divides input beam signals and routes a desired input beam signal to a respective one of the channel processors 14($a$–$m$). Channel processors 14($a$–$m$) filter the input beam signals into channel signals.

Each channel signal corresponds to a channel of the input beam signal. Each channel signal has a different frequency than the frequencies of the other channel signals corresponding to the other channels in frequency beam bandwidth of the input beam signal.

Each of the channel processors 14(a–m) includes a respective input mixer 32(a–m). Each input mixer 32(a–m) is connected to a local oscillator (LO) (not specifically shown) to receive a respective LO frequency signal $f_{down(a-m)}$. Channel processors 14(a–m) employ mixers 32(a–m) to down convert the input beam signal from a high input frequency to an intermediate frequency prior to filtering the input beam signals into channel signals. The LO frequency signals $f_{down(a-m)}$ have a selected frequency such that the input beam signals within channel processors 14(a–m) have a common intermediate frequency after passing through input mixers 32(a–m).

Each of the channel processors 14(a–m) further includes a filter 34(a–m) connected to a respective one of input mixers 32(a–m). Filters 34(a–m) filter the frequency down converted input beam signals to pass channel signals having a selected channel bandwidth. Filters 34(a–m) are set to be at a common center frequency causing the channel signals to have the same center frequency after passing through the filters. Filters 34(a–m) control the channel bandwidth such that the channel bandwidth for each of the channel processors 14(a–m) are reconfigurable and may be independently selected.

Amplifiers 36(a–m) within channel processors 14(a–m) amplify the channel signals with a uniform gain. Amplifiers 36(a–m) provide the amplified channel signals to respective automatic gain controllers (AGC) 38(a–m). AGC 38(a–m) amplify the channel signals to automatically normalize the signal strength of each of the channel signals to a reference value. AGC 38(a–m) compensate for the input power variation among channel signals.

AGC 38(a–m) provide the amplified channel signals to respective manual gain controllers (MGC) 40(a–m). MGC 40(a–m) amplify the channel signals to have a selected signal strength. MGC 40(a–m) allows the signal strength of each of the channel signals of channel processors 14(a–m) to vary from one another.

MGC 40(a–m) provide the amplified channel signals to respective output mixers 42(a–m). Each output mixer 42(a–m) is connected to a local oscillator (not specifically shown) to receive a respective LO frequency signal $f_{up(a-m)}$. Channel processors 14(a–m) employ output mixers 42(a–m) to up convert the channel signal from the common intermediate frequency to a relatively high output frequency. The channel signals within channel processors 14(a–m) have high output frequencies after passing through output mixers 42(a–m). The LO frequency signal $f_{up(a-m)}$ have predetermined frequencies such that the channel signals correspond to selected channels of the output beam signal after passing through output mixers 42(a–m). Thus, channel processors 14(a–m) change the frequency of the channel signals to route them to selected channels of selected output beam signals.

Output switch matrix 16 receives the channel signals from output mixers 42(a–m) via input channel ports 22(a–m). Output switch matrix 16 combines selected channel signals into output beam signals. Output switch matrix 16 outputs the output beam signals to beam ports 24(a–p). Preferably, before transmission by transmitter antenna circuitry, the output beam signals are amplified by respective MGC 44(a–p). MGC 44(a–p) amplify the output beam signals to vary the gain between the signals.

An on-board or ground controller controls the operation of analog transponder processor 10 (not specifically shown). For instance, the controller controls input switch matrix 12 to select which channel processors 14(a–m) are to receive which input beam signals from the input switch matrix. The controller also determines which channel signals from the input beam signals are to be routed to selected channels of selected output beam signals. The controller also controls the frequencies of the LO signals provided to input mixers 32(a–m) and output mixers 42(a–m). The controller further controls filters 34(a–m) to select the channel bandwidth and center frequencies. The controller further controls output switch matrix 16 to selectively combine the channel signals into output beam signals.

Figure 3:
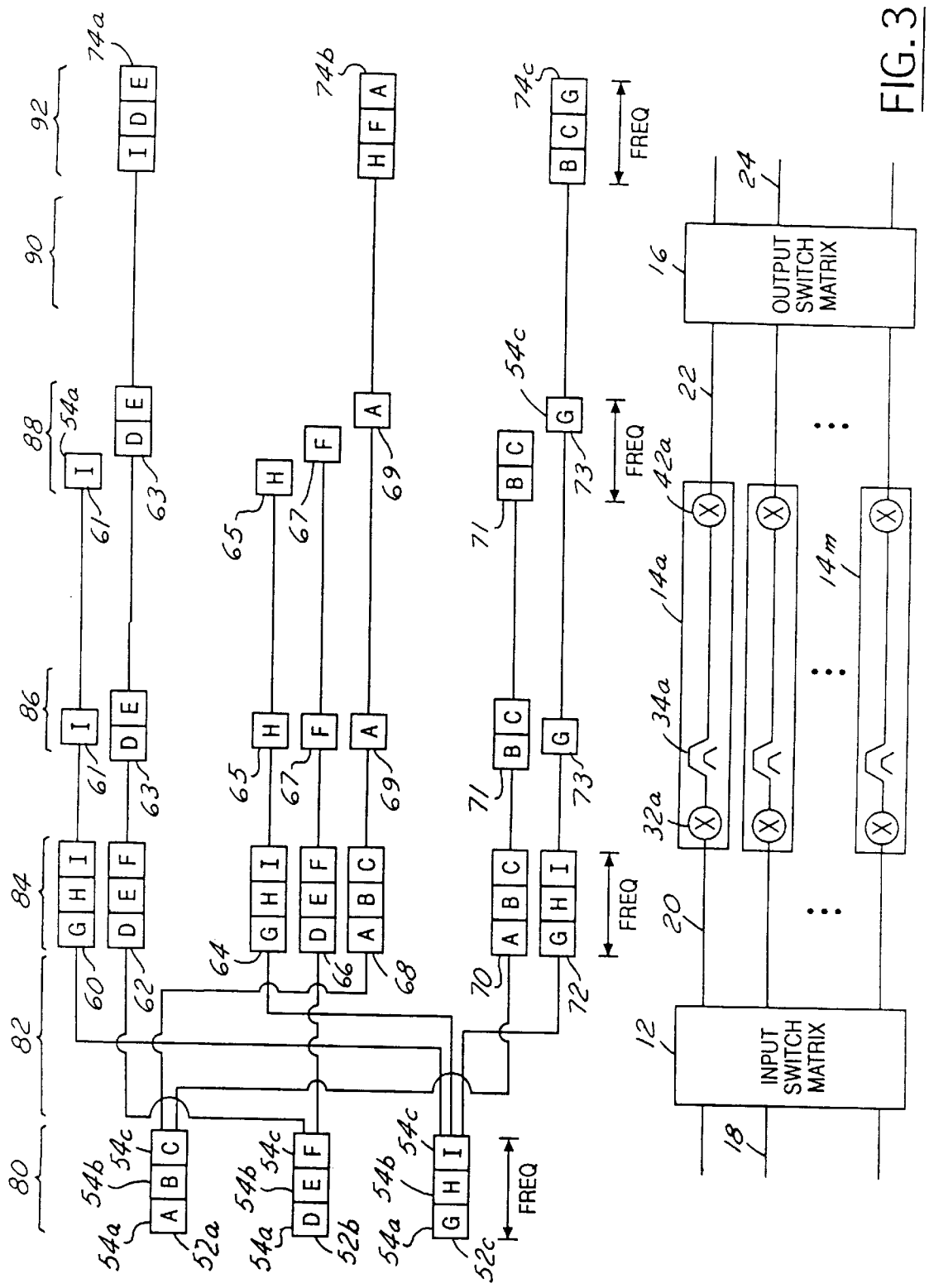
FIG. 3 illustrates an example of the processing operation of the analog transponder processor.

Referring now to FIG. 3 with continual reference to FIGS. 1 and 2, the operation of an analog transponder processor 10 will be described. FIG. 3 illustrates the processing of the channels of the input beam signals as these signals are routed by input switch matrix 12, filtered into channel signals and then frequency shifted by channel processors 14(a–m), and then combined into output beam signals by output switch matrix 16.

In operation, input switch matrix 12 receives three input beam signals 52(a–c) via respective input beam ports 18 as depicted by reference numeral 80. Each input beam signal 52(a–c) has three frequency separated channels 54(a–c) carrying channel signals. The input beam signals are shown as having the same frequencies. Of course, the frequencies of the input beam signals may be different. The channel signals are designated with capital letters, e.g., A, B, C, etc to facilitate understanding of the operation of the present invention.

Input switch matrix 12 power divides input beam signals 52(a–c) as depicted by reference numeral 82 into sets of input beam signals 60, 62, 64, 66, 68, 70, and 72. The input beam signals are provided to respective channel processors 14(a–m) via output channel ports 20 of input switch matrix 12 as depicted by reference numeral 84.

Each input beam signal provided to respective channel processors 14(a–m) is mixed with local oscillator signals in input mixers 32(a–m). The input beam signals are mixed to be down converted to a common intermediate frequency. Each of the LO signals have different predetermined frequencies such that each input beam signal has the same intermediate frequency after passing through input mixers 32. Filters 34(a–m) then filter the frequency down converted input beam signals to pass channel signals 61, 63, 65, 67, 69, 71, and 73 as depicted by reference numeral 86.

The channel signals are then mixed with other local oscillator signals in output mixers 42(a–m). The channel signals are mixed to be up converted. The channel signals are also mixed such that the channel signals correspond to selected channels of the output beam signals after passing through output mixers 42(a–m) as depicted by reference numeral 88. To mix the channel signals to correspond to selected channels of the output beam signals, each of the LO signals provided to output mixers 42(a–m) have different selected frequencies.

The frequencies of the LO signals may be selected to cause the channel signals to correspond to different channels of the input beam signals after mixing. For instance, channel signal 73, which corresponded to channel 54a of input beam signal 52c, now corresponds in sequence (not frequency) to channel 54c. Thus, the LO signal mixed with channel signal 73 is selected to boost the frequency of channel signal 73 to a relatively higher frequency channel. Similarly, channel signal 61, which corresponded to channel 54c of input beam signal 52a, now corresponds in sequence to channel 54a. The local oscillator signal mixed with channel signal 61 is selected to lower the frequency of channel signal 61 to a relatively lower frequency channel. The frequencies of the LO signals may also be selected to cause the channel signals to correspond to the same channels after mixing. Further, a channel signal of an input beam signal can be broadcasted to any number of channels of the output beam signals.

Output switch matrix 16 then receives the channel signals via respective input channel ports 22. Output switch matrix 16 combines the selected channel signals as depicted by reference numeral 90 into output beam signals 74(a–c). Each output beam signal 74(a–c) has three frequency separated channels 78(a–c) carrying channel signals. Output switch matrix 16 then outputs output beam signals 74(a–c) via output beam ports 24 as depicted by reference numeral 92.

This illustrates the general operation of analog transponder processor 10 for routing any channel of any input beam signal to any channel of any output beam signal. As described above, the channel signals can be processed to have selected bandwidth, center frequencies, guard-bands, and different signal strengths.

Thus it is apparent that there has been provided, in accordance with the present invention, an analog transponder processor and an analog transponder processing method that fully satisfy the objects, the aims, and the advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. For use in a multibeam satellite receiving input beam signals and transmitting output beam signals, wherein the input and output beam signals have corresponding channels arranged in a sequence for carrying channel signals, an analog transponder processor comprising:

an input microwave switch matrix for power dividing input beam signals into sets of input beam signals;

a plurality of channel processors each receiving at least one input beam signal from the input microwave switch matrix, wherein the channel processors filter the input beam signals into channel signals, wherein each of the channel processors includes a first mixer for changing the frequency of the input beam signals to a common frequency prior to filtering the input beam signals into channel signals and a second mixer for changing the frequency of at least one channel signal from the common frequency such that the at least one channel signal corresponds to a different channel in the sequence than the respective channel of the input beam signals; and an output microwave switch matrix for combining the channel signals into output beam signals, wherein each of the channel signals corresponds to a respective channel of the output beam signals with the at least one channel signal of the output beam signals corresponding to the different channel in the sequence than the respective channel of the input beam signals.

2. The processor of claim 1 wherein:

each of the channel processors includes a filter for setting the bandwidth of the channel signals.

3. The processor of claim 1 wherein:

each of the channel processors includes an automatic gain controller for normalizing signal strength of each of the channel signals to a reference value.

4. The processor of claim 1 wherein:

each of the channel processors includes a manual gain controller for setting signal strength of each of the channel values to a desired level.

5. The processor of claim 1 further comprising:

a manual gain controller connected to the output switch matrix for setting signal strength of the output beam signals to a desired level.

6. For use in a multibeam satellite, a method of routing a channel of an input beam signal to a channel of an output beam signal, wherein the input and output beam signals have corresponding channels arranged in a sequence for carrying channel signals, the method comprising:

power dividing an input beam signal into sets of input beam signals using an input microwave switch matrix;

filtering the input beam signals into channel signals, wherein each of the channel signals corresponds to a respective channel of the input beam signals;

changing the frequency of the input beam signals to a common frequency prior to filtering the input beam signals into channel signals;

changing the frequency of at least one channel signal from the common frequency such that the at least one channel signal corresponds to a different channel in the sequence than the respective channel of the input beam signals; and combining the channel signals into output beam signals using an output microwave switch matrix, wherein each of the channel signals corresponds to a respective channel of the output beam signals with the at least one channel signal of the output beam signals corresponding to the different channel in the sequence than the respective channel of the input beam signals.

7. The method of claim 6 further comprising:

setting the bandwidth of the channel signals.

8. The method of claim 6 further comprising:

normalizing signal strength of each of the channel signals to a reference value.

9. The method of claim 6 further comprising:

setting signal strength of each of the channel signals to a desired level.

10. The method of claim 6 further comprising:

setting signal strength of the output beam signal to a desired level.

* * * * *